United States Patent
TeSelle

(10) Patent No.: US 7,711,142 B2
(45) Date of Patent: May 4, 2010

(54) METHOD AND SYSTEM FOR COMPOSING A DIGITAL SIGNATURE GRAPHIC APPEARANCE AND SPECIFYING A DOCUMENT DISPLAY LOCATION THEREOF

(76) Inventor: John TeSelle, 405 Fairfax Ave., Nashville, TN (US) 37212

( * ) Notice: Subject to any disclaimer, the term of this patent is extended or adjusted under 35 U.S.C. 154(b) by 0 days.

(21) Appl. No.: 11/408,445

(22) Filed: Apr. 22, 2006

(65) Prior Publication Data

US 2006/0251290 A1    Nov. 9, 2006

Related U.S. Application Data

(60) Provisional application No. 60/677,395, filed on May 3, 2005.

(51) Int. Cl.
*G06K 9/00* (2006.01)
(52) U.S. Cl. ........................ 382/100; 713/176
(58) Field of Classification Search ................. 382/100, 382/232; 713/176; 348/460, 463; 380/210, 380/252, 287, 54; 704/200.1, 273; 381/73.1
See application file for complete search history.

(56) References Cited

U.S. PATENT DOCUMENTS

| | | | | |
|---|---|---|---|---|
| 5,271,065 A * | 12/1993 | Rourke et al. | ................ | 382/112 |
| 5,367,573 A * | 11/1994 | Quimby | ....................... | 713/167 |
| 5,530,759 A * | 6/1996 | Braudaway et al. | ............ | 380/54 |
| 5,606,609 A * | 2/1997 | Houser et al. | ................ | 713/179 |
| 5,664,018 A * | 9/1997 | Leighton | ..................... | 380/54 |
| 5,930,369 A * | 7/1999 | Cox et al. | ..................... | 380/54 |
| 6,082,619 A * | 7/2000 | Ma et al. | .................. | 235/462.1 |
| 6,134,338 A | 10/2000 | Solberg | | |
| 6,532,541 B1 | 3/2003 | Chang | | |
| 6,668,068 B2 * | 12/2003 | Hashimoto | ................... | 382/100 |
| 6,757,826 B1 * | 6/2004 | Paltenghe | .................... | 713/170 |
| 6,763,123 B2 * | 7/2004 | Reed et al. | ................... | 382/100 |
| 6,779,178 B1 | 8/2004 | Lloyd | | |
| 6,848,048 B1 | 1/2005 | Holmes | | |
| 6,882,737 B2 * | 4/2005 | Lofgren et al. | .............. | 382/100 |
| 6,904,524 B1 * | 6/2005 | Jaeger et al. | ................ | 713/176 |
| 7,095,873 B2 * | 8/2006 | Venkatesan et al. | ......... | 382/100 |
| 7,178,030 B2 * | 2/2007 | Scheidt et al. | .............. | 713/176 |
| 7,180,608 B1 * | 2/2007 | Yu | .............................. | 358/1.1 |
| 7,222,235 B1 * | 5/2007 | Mitsui | ........................ | 713/176 |
| 7,395,503 B1 * | 7/2008 | Pravetz | ....................... | 715/268 |
| 2002/0029219 A1 | 3/2002 | Mulzer | | |
| 2003/0221105 A1 | 11/2003 | Bajaj | | |
| 2005/0055627 A1 | 3/2005 | Lloyd | | |
| 2005/0160271 A9 * | 7/2005 | Brundage et al. | ........... | 713/176 |

* cited by examiner

*Primary Examiner*—Anand Bhatnagar
(74) *Attorney, Agent, or Firm*—Ariel S. Bentolila; Bay Area IP Group, LLC

(57) ABSTRACT

One aspect of the present invention is to graphically configure a digital signature appearance to be suitable for being configured into the electronic document. Another aspect of the present invention is to place a digital signature appearance graphic into the electronic document. A method of implementing the graphic configuration aspect of the present invention includes the steps of generating a composition environment for configuring a graphical appearance of the digital signature and its placement origin point. A method of implementing the digital signature graphic placement aspect includes the steps of specifying a reference point in the digital signature appearance, determining a graphic scaling factor and placement location in the electronic document, which is at least partially based on the reference point and tile placement origin point, and placing it accordingly. A method for specifying and placing the configured digital signature appearance on multiple pages of a multi-page electronic document is also described.

14 Claims, 10 Drawing Sheets

METHOD AND SYSTEM FOR COMPOSING A DIGITAL SIGNATURE GRAPHIC APPEARANCE AND SPECIFYING A DOCUMENT DISPLAY LOCATION THEREOF

CROSS-REFERENCE TO RELATED APPLICATIONS

The present Utility patent application claims priority benefit of the U.S. provisional application for patent No. 60/677, 395 filed on May 3, 2005 under 35 U.S.C. 119(e). The contents of this related provisional application are incorporated herein by reference.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.
COPYRIGHT NOTICE
A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally lo digital signatures on electronic documents. More particularly, the invention relates to a method of composing a graphic appearance associated with a digital signature and method of specifying the location of this appearance on the electronic document.

BACKGROUND OF THE INVENTION

When a digital signature is applied to an electronic document, there is often a need to include a graphic appearance that will be displayed on the electronic document to indicate that a digital signature has been applied. The appearance is not strictly a part of the digital signature, but the appearance is closely linked to the digital signature and in many implementation is the appearance includes some feature that displays graphically the validity of the digital signature that is associated with it.

In many cases, users of digital signature software need to specify what types of information will be included in the appearance. Examples of information that might be included are without limitation, a raster image of a handwritten signature, a date of signing, a time of signing, and other similar information.

Once the graphic appearance has been specified, there is a need to indicate a location on the document where the appearance should be visible when the digital signature is applied to the document.

In some cases, there is a need to apply only a single digital signature and associated appearance to a document. In other cases, there is a need to apply multiple digital signatures and associated appearances to the document. In certain situation is, it is necessary to apply a single digital signature or multiple digital signatures to a document and to have the appearance associated with the Signature be duplicated on the same, location of every page of a multi-page document.

Prior art methods of specifying a digital signature appearance typically involve selecting item is such as, but not limited to, the signer's name, a digitized graphic, the date of signing, the time of signing, and the reason for signing, from a menu of choices. These items are then placed in the appearance by software in a location and at a scale that is determined automatically by the software. In prior art methods, the user does not control the size rotation, and placement of graphic elements in the appearance, or the font used for text such as date and time. In these prior art methods, the sizes of graphic elements that are included in the appearance are defined relative to one another only, and it is not possible to indicate a scale relative to graphic elements associated with an electronic document or a known paper size.

Prior art methods of specifying where the appearance associated with the digital signature should be located on the document typically involve indicating a window or bounding box into which the appearance will be scaled to fit. In some implementations this bounding box is drawn interactively by the user. In other implementation is the bounding box may be created in advance, and then it is selected by the user as the location for his or her signature appearance to be placed.

In these prior art methods, the size and location of the appearance associated with the signature on the document can be indicated only approximately. When the user draws a bounding box or selects a previously created bounding box for the appearance, the appearance is scaled to lit within this bounding, box, and the appearance may or may not be the correct scale relative to or aligned with graphic elements in the electronic document as desired by the user.

There are two prior art methods of indicating that a signature appearance should be displayed in the same location on every page. The first method is to apply multiple individual signatures, each one with an appearance on a different page. Typically this is done by creating a bounding box on each page or by selecting a previously created bounding box on each page. This method is time consuming, as the user must specify repeatedly that where the appearance should be located. This method often creates large electronic document files as well, as there is a certain amount of overhead associated with each digital signature, and often or hundreds of signatures are applied to a document, the electronic document may become unmanageably large.

The second prior-art method is for the user to create a bounding box for a digital signature appearance, but not yet create a digital signature associated with the box. In a second step, the user duplicates this bounding box on multiple pages of the document. In a third step, the user selects one of these duplicated bounding boxes and indicates that all the duplicated bounding boxes are to receive the same digital signature appearance. This method has the result of creating only one digital signature (and thus a smaller file size) but multiple instances of the appearance associated with this signature. This method involves at least three discrete steps, however, and is therefore time-consuming.

In view of the foregoing, there is a need for an improved method of composing a customized graphical appearance associated with a digital signature and applying that appearance to a desired range of-pages in an electronic document in a way that allows the user to specify the scale and location of the appearance on the electronic document and that is less time conuming and creates smaller electronic files than current methods

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
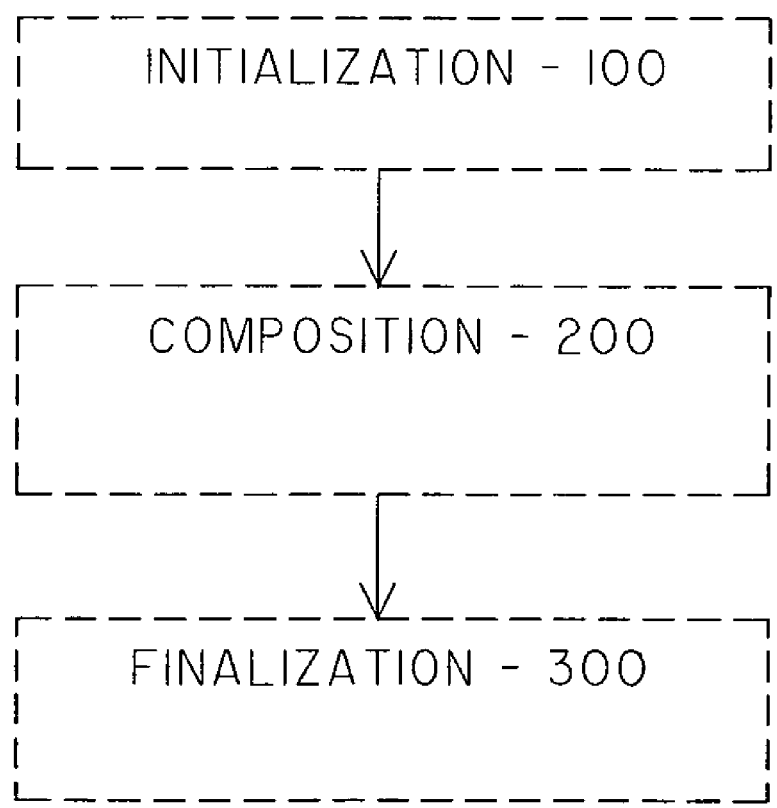
FIGS. 1 through 8 show flowcharts illustrating an exemplary implementation in computer software of a method for composing a graphic appearance associated with a digital signature, in accordance with an embodiment of the present invention.
Figure 2:
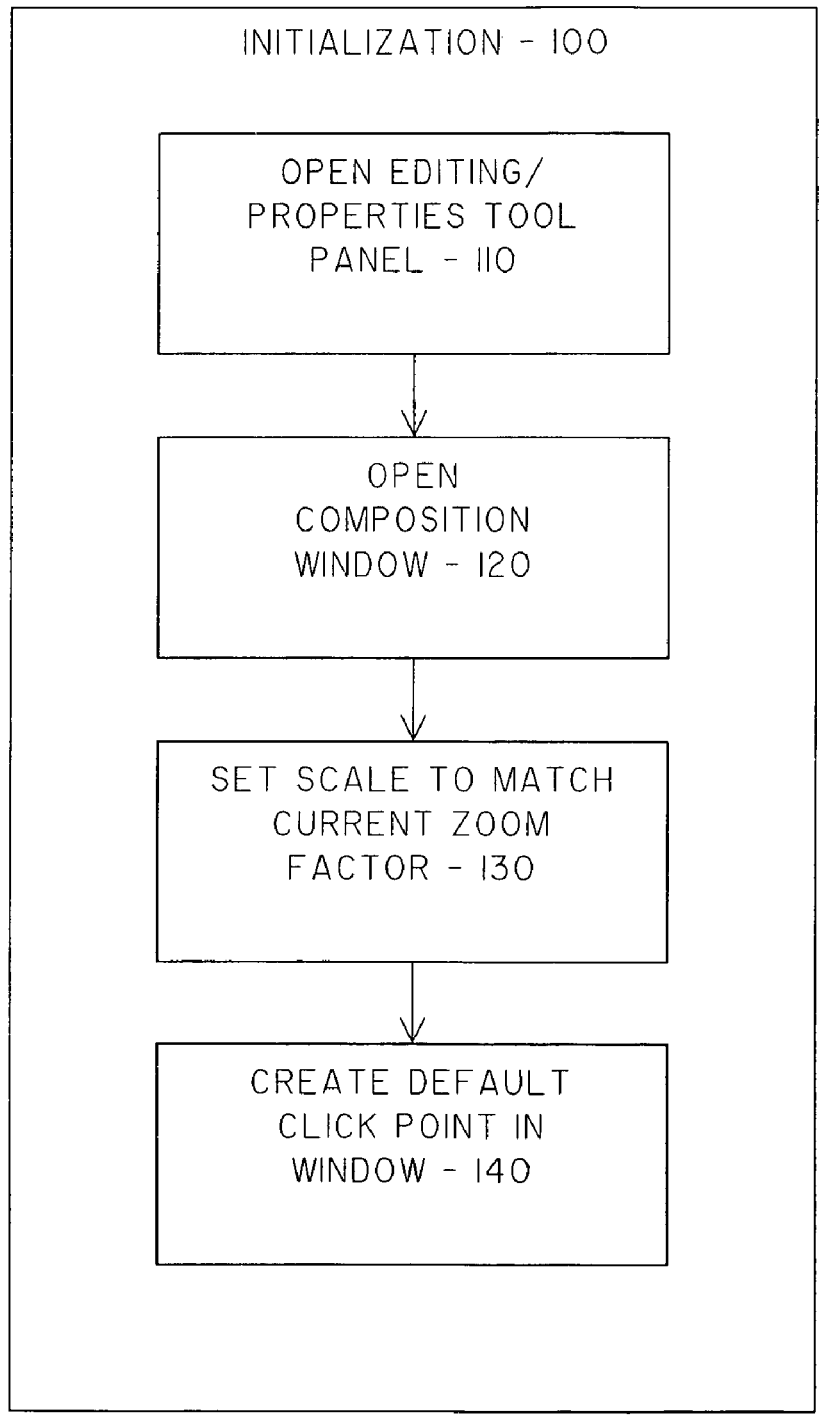
Figure 3:
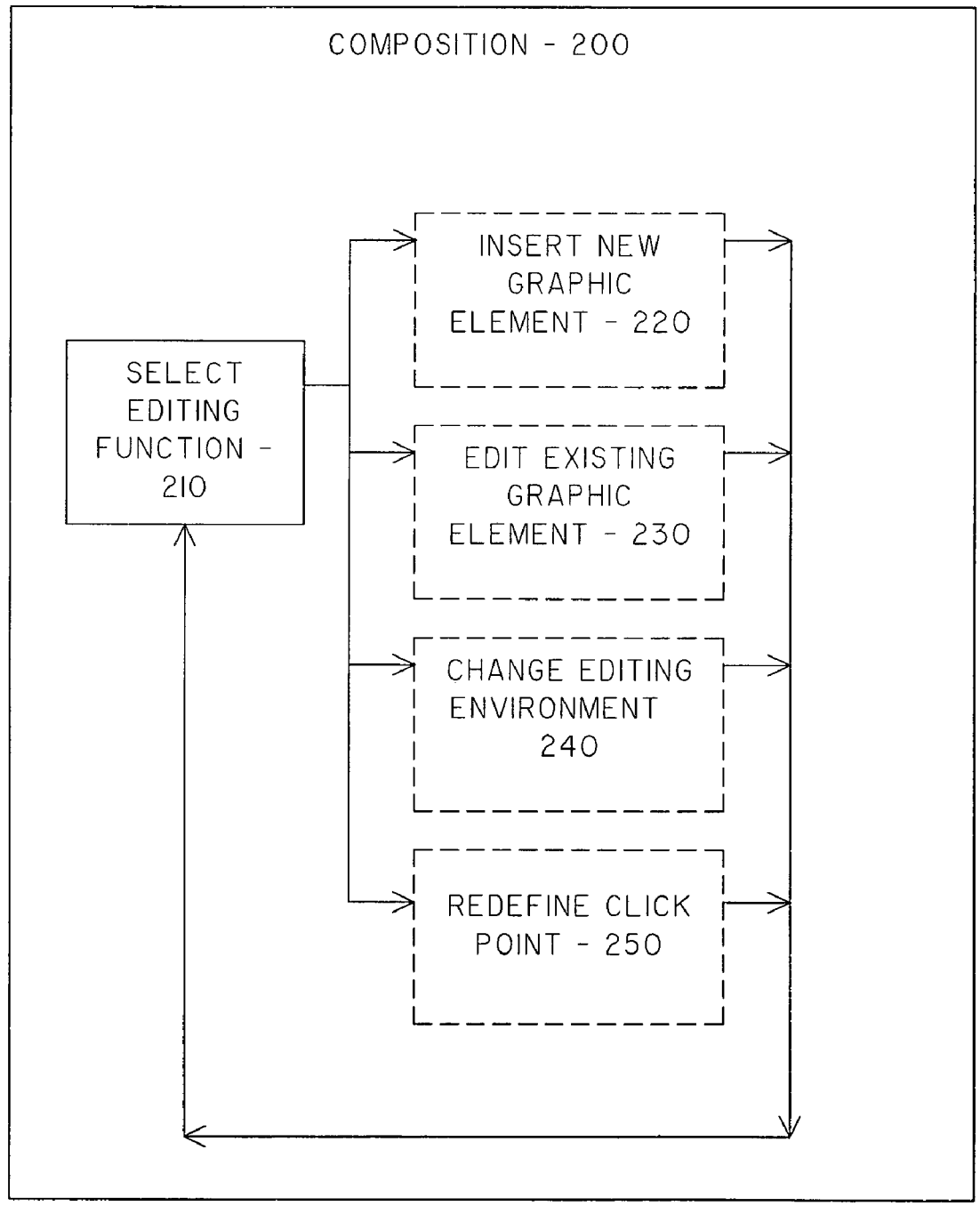
Figure 4:
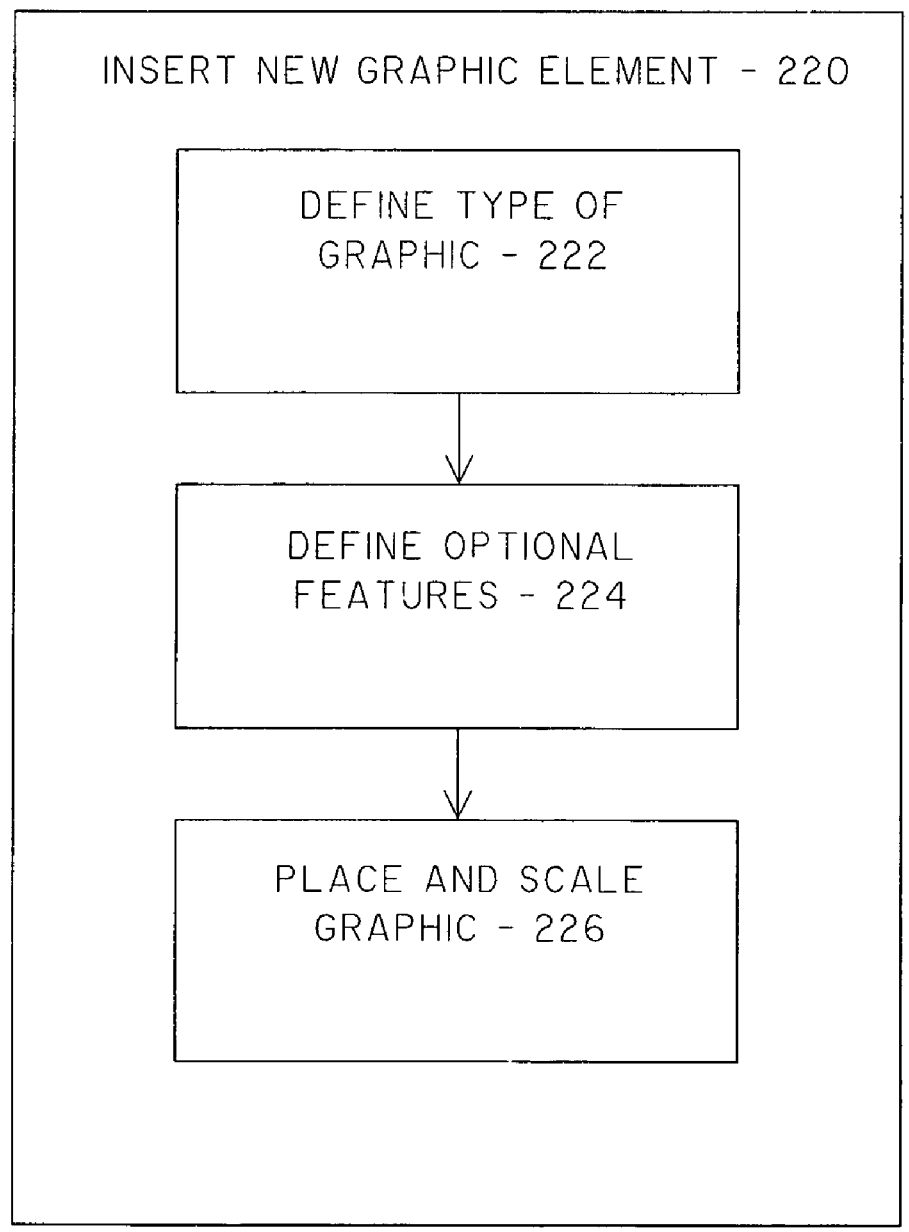
Figure 5:
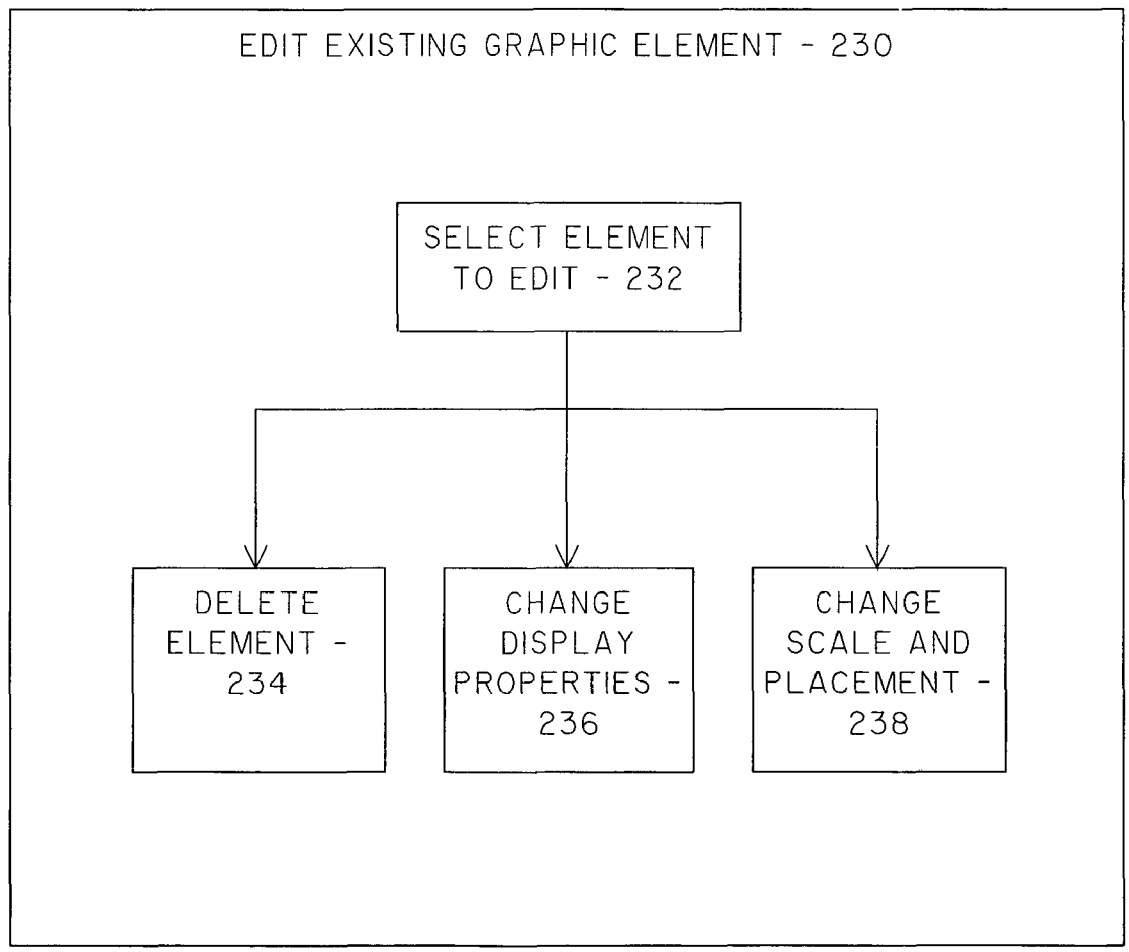
Figure 6:
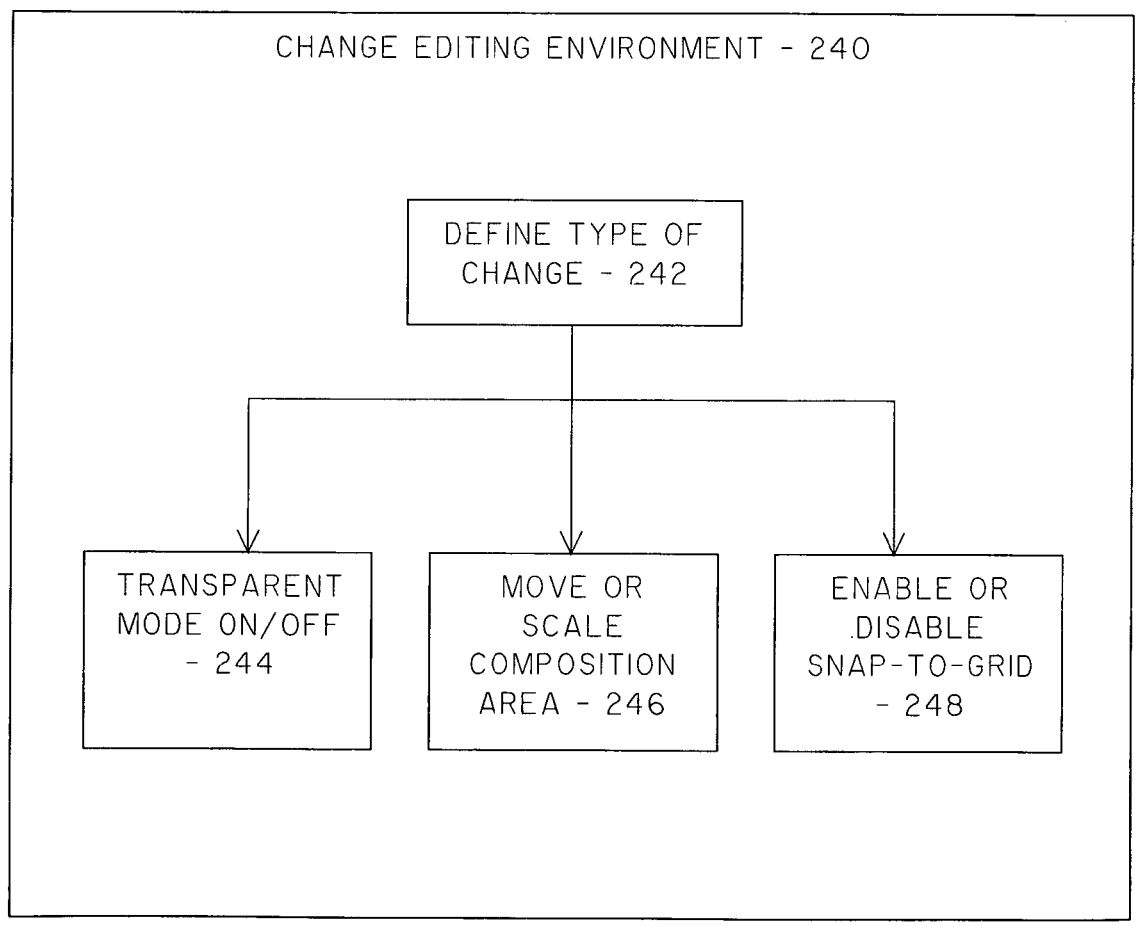
Figure 7:
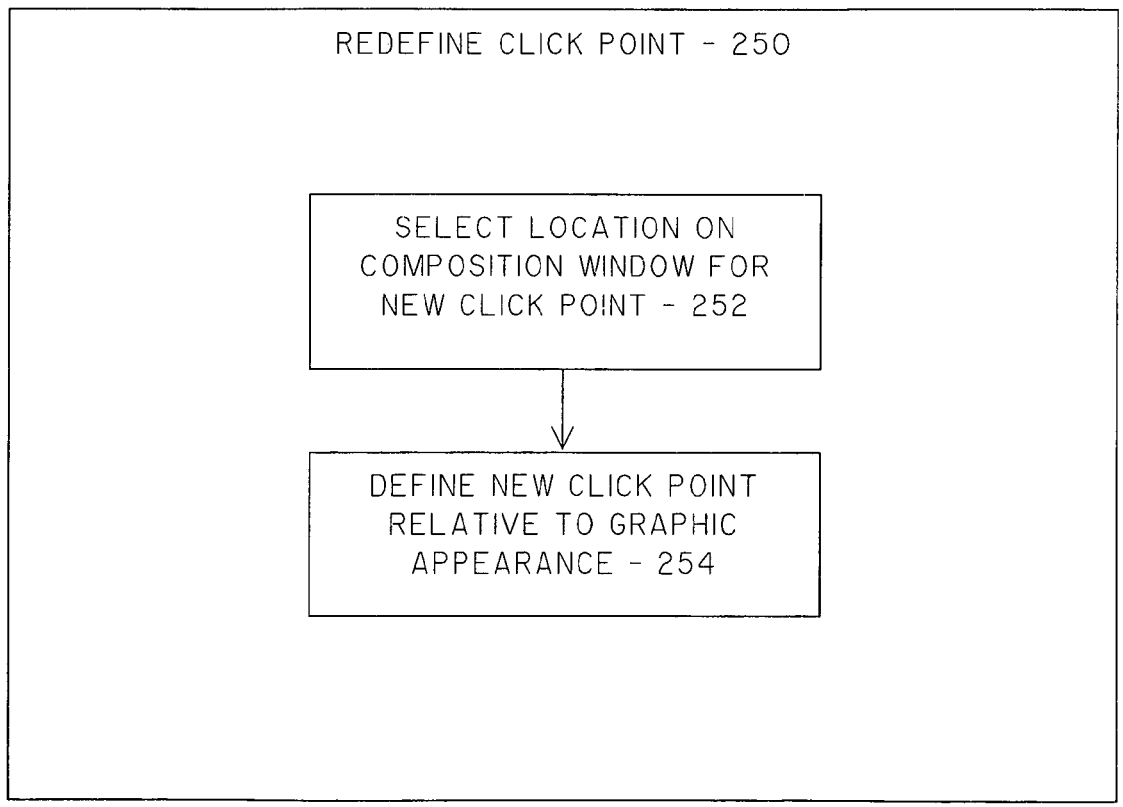
Figure 8:
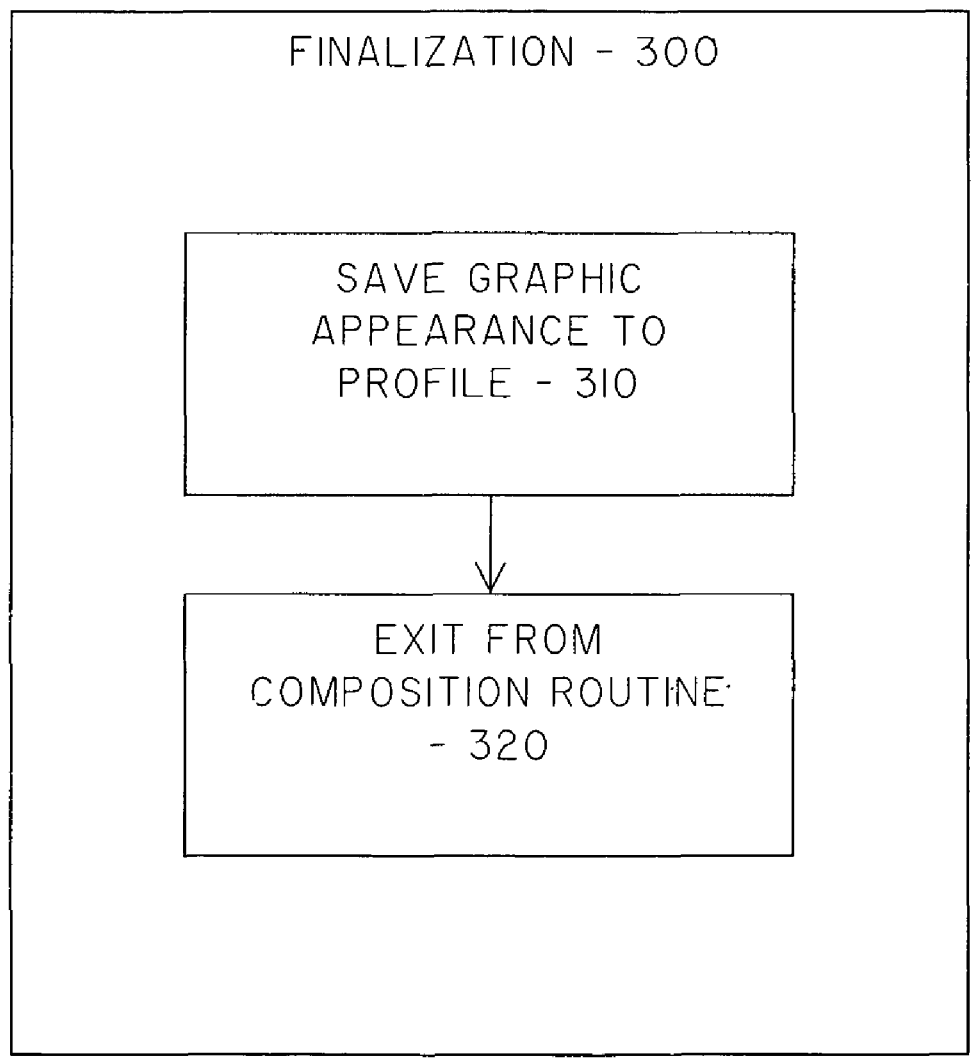

Unless otherwise indicated illustrations in the figures are not necessarily drawn to scale.

SUMMARY OF THE INVENTION

To achieve the forgoing and other objects and in accordance with the purpose of the invention, a variety of techniques for configuring a digital signature graphic into an electronic document are described.

One aspect of the present invention is to graphically-configure a digital signature to be suitable for being configured into the electronic document. Another aspect of the present invention is to place a digital signature graphic into the electronic document.

A method embodiment implementing the graphic configuration aspect of the present invention includes the steps of generating a composition environment for configuring the digital signature graphic, using the composition environment to configure a graphical appearance of the digital signature, and using the composition environment to specify a reference point in the digital signature, the reference point being operable for use as a placement origin point.

A method embodiment implementing the digital signature graphic placement aspect of the present invention includes the steps of specifying a reference point in the digital signature appearance, the reference point being operable for use as a placement origin point, determining a graphic scaling factor that the digital signature will be displayed at, determining a digital signature placement location in the electronic document at least partially based on the reference point and the placement origin point, and configuring the digital signature into the electronic document at a placement location and scale at least partially based on the digital signature placement location and the scaling factor. Some embodiments of the present invention further include the step of specifying and placing the configured digital signature appearance on multiple pages of a multi-page electronic document.

Also described are Steps or and a software program product for implementing the functions described above.

Other features, advantages, and object of the present invention will become more apparent and be more readily understood from the following detailed description, which Should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognized a multiplicity of alternate and suitable approaches, depending upon the needs of tie particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

The present invention will now be described in detail with reference to embodiments thereof as illustrated in the accompanying drawings.

Figure 9:
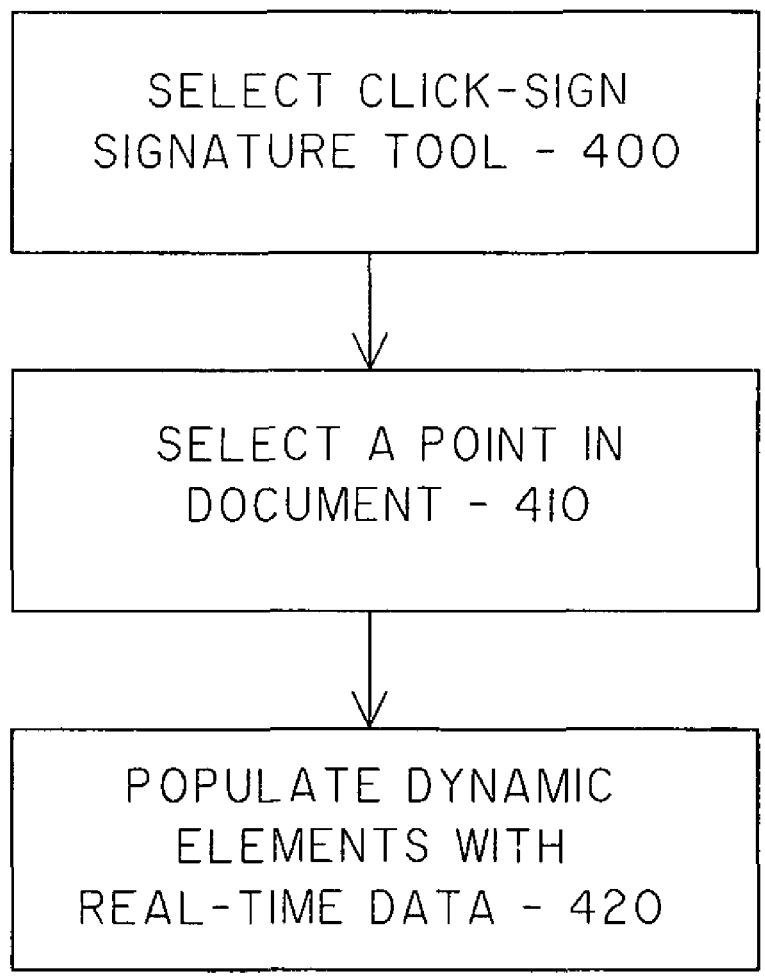
FIGS. 9 through 10 show flowcharts illustrating an exemplary implementation in computer software of a method for specifying the location or locations in a document where a previously composed appearance Should be visible when the digital signature is applied to an electronic document, in accordance with an embodiment of the present invention.
Figure 10:
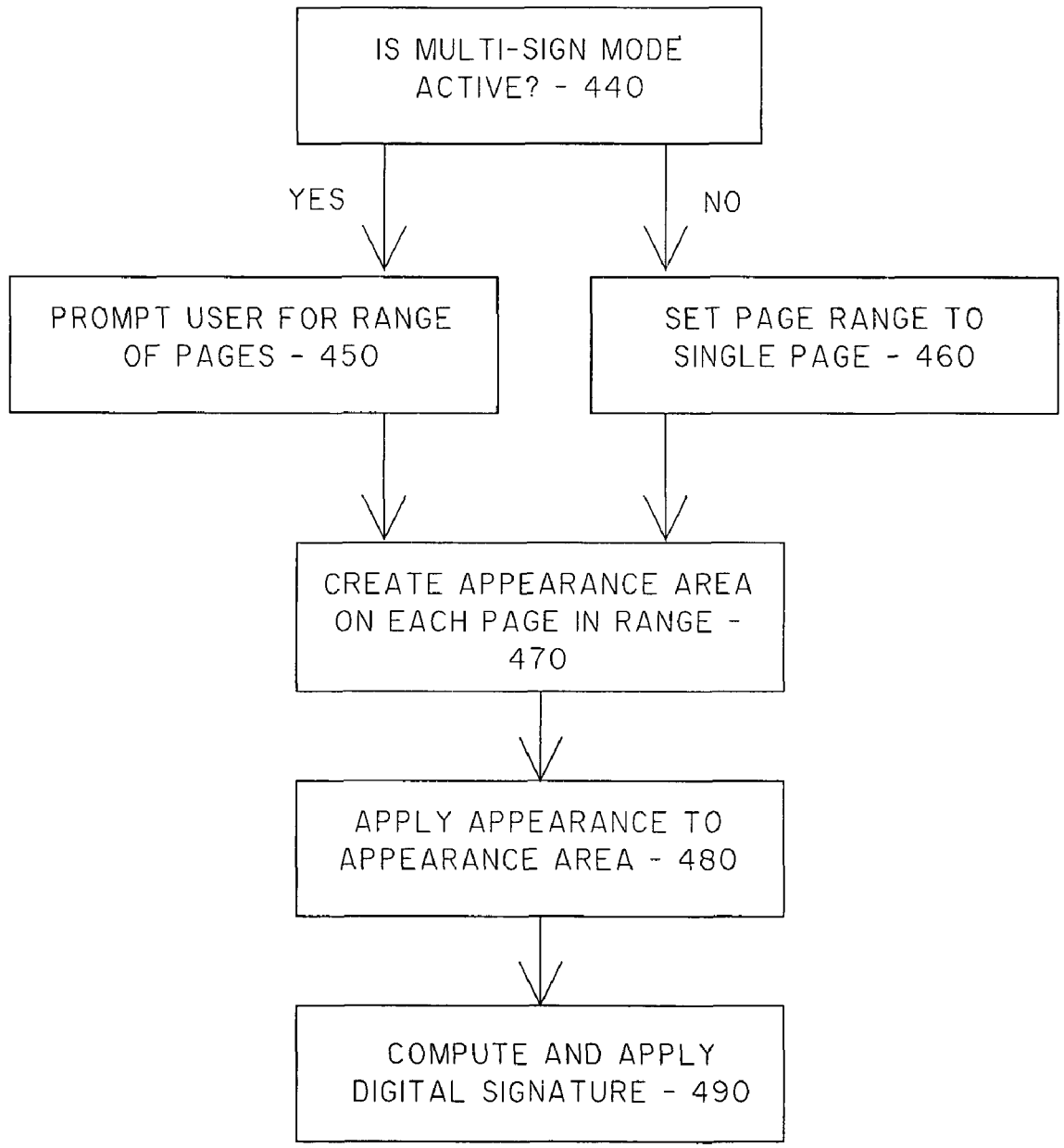

The preferred embodiment of the present invention is comprised of two main parts: the composition of tile graphic appearance, shown by way of example in FIGS. 1 through 8, and the specification of the location for this appearance on one page or multiple pages of tie electronic document, shown by way of example in FIGS. 9 through 10. The first part is used to define the appearance before the second part can specify the location of the appearance on the electronic document. In some embodiments one of the parts may work independently of the other, however it is preferred that they are used together.

FIGS. 1 through 8 show a flow chart illustrating an exemplary implementation in computer software of a method for composing a graphic appearance associated with a digital signature, in accordance with all embodiment of the present invention. An appearance is the graphic image that is associated with the digital signature. This appearance or image is not actually part of the digital signature, which itself is invisible, but is a graphic associated with the digital signature that the user sees on the electronic document when the document is signed. In this part of the present embodiment, the user composes a graphic appearance and associates with this appearance an absolute scale and an origin point, herein called a Click Point.

While the appearance is being composed, the user may elect to use an electronic document as a guide or reference for scaling and aligning the graphic elements of the appearance. This may be done in two different ways. In one implementation, the composition area is superimposed over an underlying electronic document, or, alternately, an electronic document is superimposed over the composition area, such that it appears as if the graphic elements comprising the signature appearance are being manipulated on the electronic document itself in another implementation, a composition window may be specified to be either opaque or transparent. In the transparent mode the composition window is transparent, and, if an electronic document is underneath it on screen, this underlying document will be visible through the window, as if the window were made of glass or tracing paper. In either implementation, this feature allows graphic elements of the signature appearance to be arranged so that they will line up with graphic features of the electronic document.

In the second implementation described above, to assist in aligning the composition window with the electronic guide document, the user may either move the window to position it over a part of the underlying electronic document, or the user may shift the position of the electronic document view to aligiment with the appearance being edited. The effect of either of these methods is the same, as they both allow graphic elements of-the signature appearance to be aligned with graphic elements of the electronic guide document.

Graphic elements may include, without limitation, the following: graphic images such as, but not limited to, color pictures, scan is of handwritten signatures, or vector graphics; dynamic text fields such as, but not limited to, date, time, signer's name, signer's location, or the reason for signing; static text fields containing text typed by the user; and a field indicating the validity state of the digital signature. Dynamic text fields are represented in the composition window by a placeholder element that shows the format of the element but not the actual text that will be displayed when the appearance is applied to a document with a digital signature. These dynamic fields take on their final appearance only at the time the signature is applied.

The creation of a graphic appearance according to the present embodiment begins with an initialization step 100, proceeding to a composition step 200, and ending with a finalization step 300.

The initialization step 100 begins with step 110 in which the editing and properties tool panel is opened. In step 120 the composition window is opened. In step 130 the software automatically sets the scale of the composition window to match a certain zoom or enlargement factor that determines how large elements appear on the screen relative to their internal absolute sizes. In some cases, this may be a default zoom factor. In other cases, it may be beneficial to the user to compose the signature appearance with reference to an existing electronic document, so that graphic elements in the signature appearance will align with elements in the reference electronic document. If this is the case, then the zoom factor in the composition window is set to equal that of the reference electronic document. Finally, in step 140, the software creates a Click Point in the composition window. When the composition window is first initialized, a default origin or Click Point is defined. The user may accept this default click point and not change it, or in the course of composing the signature appearance the user may specify a new Click Point by defining a point in the graphic that is to be the new Click Point.

After initialization step 100, the user proceeds to composition step 200 where the appearance is composed. In step 210 the user selects an operation to perform on the Signature appearance. The process of composing, the signature appearance consists of four types of operations, which may be performed in any order, and any number of times. (or not performed at all), until the appearance meets the user's requirements. These foul operations can be defined as Insert New Graphic Element (step 220), Edit Existing Graphic Element (step 230), Change Editing Environment (step 240), and Redefine Click Point (step 250).

Insert New Graphic Element is illustrated in step 220. The user begins in step 222 by selecting, a type of graphic such as, but not limited to, a digitized picture, a dynamic text field Such as the signer's name or the date or time of signing, or a static text field containing text input by the user. An element indicating the validity state of the digital signature is typically included by default, although in some implementation is this element could also be optional. Then, in step 224, the user selects optional features such as, but not limited to, the size of the element (such as for a digitized graphic), the color, font, and orientation (for text fields), transparency attributes (to allow elements underneath the graphic element to be visible), or formatting attributes (such as for date and time fields, indicating, one of several standard formats for representing these types of information). Then, in step 226, the user places and scales the graphic element in the composition window. All graphic elements that are added to the signature appearance are assigned an absolute size and a location relative to the Click Point. Elements are displayed in the composition window at a scale relative to the specific zoom factor of the composition window, thereby allowing the appearance being composed to be associated with an actual size or scale that corresponds to the scale of the electronic document being used as a reference.

Edit Existing Graphic Element is illustrated in step 230. After an element has been inserted in the composition window, it may edited it a variety of ways to change its display characteristics. In step 232 the user selects an element in the composition window and by further actions with mouse clicks or with keystrokes on the keyboard modifies the element in one of three ways. It may be deleted from the signature appearance as in step 234, or its display properties, such as but not limited to font size, color, format, orientation, transparency, may be modified as in step 236. The scale of digitized (graphics may also be changed, as may the location of any element in the composition window as in step 238.

Change Editing Environment is illustrated in step 240. Changes to the editing environment do not affect the signature appearance itself but rather alter the appearance and function of the composition window to allow certain types of editing functions to the appearance to be performed more easily in step 244, the composition window may be made transparent or semi-transparent so that a reference or guide document may be visible underneath the composition window, thereby allowing the use to align elements in the digital signature with parts of the guide document. Or in step 246 the entire composition window may be moved relative to the guide or reference document, so that the user may choose which parts of the reference document are to be used for alignment. In an alternate implementation, the reference document could be moved and the composition window could be maintained in its original position to accomplish the same effect. In step 248, an invisible grid may be turned on or off to cause elements of the signature appearance to line up with the grid divisions when they are moved, thereby providing an aid to the user in aligning elements with each other.

Redefine Click Point is illustrated in step 250. The Click Point is the origin of the signature appearance and is a reference point that may be used when applying the digital signature to an electronic document. The Click Point is not visible in the actual digital signature appearance applied to the document, but for purposes of indicating its position it may be represented in the composition window by a special graphic symbol or alternately by a coordinate system. As shown in step 252, if the user wishes to change the location of the Click Point relative to the graphic elements in the composition window, the graphic symbol may be moved (using mouse clicks) to a different location in the composition window, or a new location may be specified with coordinates. Then in step 254 the software defines a new internal origin point for the signature appearance based on the screen coordinates chosen relative to the position of graphic elements in the composition window and zoom factor in use in the composition window.

When the user is finished composing the signature appearance in step 200, the user species to exit from signature composition mode in finalization step 300. The signature appearance is then saved to the user's signature profile, where data about this digital signature appearance is stored, along with its associated scale and the origin point or Click Point that is defined for it in step 310. Finally, the user exits from the composition routine in step 320.

FIGS. 9 through 10 show a flowchart illustrating an exemplary implementation in computer software of a method for specifying the location or locations in a document where a previously composed signature appearance should be visible when the digital signature is applied to an electronic document, in accordance with an embodiment of the present invention. In this part of the present embodiment, the user specifies a location in the electronic document where the signature appearance should be visible, and the user specifies it the appearance should be visible on only one page or on several different pages in a multi-page document in the same location on each page.

To apply the signature and specify where its appearance will be visible, the user selects a signing tool from a toolbar or menu or other user interface device in step 400. Then in step 410, the user selects a point on the electronic document with a mouse click or other means of specification. This point is then interpreted to correspond to the Click Point that was defined in the signature composition window or the default Click Point if no Click Point was explicitly defined.

In step 420, the signature appearance is then populated with information to fill in any dynamic graphic elements, such as, but not limited to, user name, reason for signing, and date and time. Static graphic elements appeal as they did when the appearance was being composed.

Before the location of the signature appearance is specified, the user chooses to activate or deactivate a mode of operation referred to herein as Multi-Signal Mode. If Multi-Signal Mode is active, then the signature appearance will be visible on several pages. If Multi-Signal Mode is not active, then the signature appearance will be visible on only one page. In the present embodiment, the routine checks the status of the Multi-Signal Mode in step 440. If Multi-Signal mode is off, the routine proceeds to step 460 where the page range for the signature appearance is set to a single page, that on which the use has clicked the mouse. If Multi-Signal mode is on, then the routine proceeds to step 450 where the user is prompted for a page range, and the page range for the signature appearance is set to that range entered by the user in a dialog box or in some other manner. The user may specify any range of pages in the document, from one page to all pages or any other selection.

An area is then defined on the screen for the signature appearance in step 470. This area is located Such that the Click Point defined for the appearance will be positioned on the point selected by the user in step 410 as a part of the signing operation. The area is sized such that the scale of the signature appearance as defined during the composition process will correspond to the scale or zoom factor currently in use in the document being viewed.

The area defined for the signature appearance is then duplicated on each specified page in the page range in step 470. If Multi-Signal mode is off, then the page range is only one page. In step 480 the signature appearance is placed in this defined area on each specified page. The routine then proceeds to step 490 where the digital signature is computed and applied to the document, thus completing the signing operation.

The actual digital signature is attached to the electronic document in step 490 of this process. This part of the process is not a part of the present embodiment as it is prior art. A result of the two parts of the present embodiment is that the user is able to compose graphic elements of the signature appearance using graphic elements of an electronic document as a guide, and is able to specify a point in the appearance as an origin or alternately, accept a default point as the origin. When the signature appearance is applied, tile user is able to apply the signature appearance in such a way that the graphic elements in the appearance align as intended with graphic elements in the electronic document, and are scaled as intended relative to graphic elements in the electronic document, and appear on the range of pages desired by the user, all with a minimal number of 'steps involved in the signing process.

In an alternate embodiment of the present invention instead of specifying a Click Point explicitly in the graphic composition window, a default insertion point may be used such as, but not limited to, the center of the appearance or the bottom left hand corner of the bounding box. In this embodiment when the user applies the signature, an image of the signature appearance would be shown scaled to the current view magnification with the hot point of the cursor at the default insertion point. This is similar to the way "stamp" images are applied to electronic documents using some types of electronic document management and editing software. A difference between the present embodiment and the preferred embodiment is that while an insertion point, or Click Point, is still used, the user is not really aware of it and does not specify where it is. Instead, the user receives graphic visual feedback and sees the image of the signature appearance as if the cursor had changed into that image. The net effect is the same because the cursor still has a hot point that communicates back to the application the place where the cursor was clicked on the screen, and this hot point is similar to the Click Point described in the preferred embodiment.

In another alternate embodiment of the present invention, instead of employing a composition window and associated tools that are specifically designed for the composition or editing of a signature appearance, a graphic created in some other software, such as page-layout software, word processing, software, or image editing software, could be imported and used as a signature appearance. In this embodiment the importing process would include steps to scale the imported graphic, define an origin similar to the Click Point, and possibly to define certain text fields as static and others as dynamic (such as, but not limited to, fields that are to represent the date or time of signing). The net effect is the same because a graphic editor of some type is being used to insert, format, and scale the elements composing the signature appearance, and a process is being used to indicate an origin for this appearance and to specify which elements are static and which contain dynamic fields that are to be populated at the time the document is signed.

Having fully described at least one embodiment of the present invention, other equivalent or alternative methods of composing, a graphic appearance associated with a digital signature and specifying the location of the appearance on an electronic document according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like.

What is claimed is:

1. A method for configuring a digital signature appearance graphic into an electronic document, the method being embodied as instructions executed by one or more computer processors, the method comprising the Steps of:
   one or more computer processors generating a composition environment for configuring a digital signature appearance where said composition environment comprises a composition window separate from said electronic document and tools for said configuring, said composition window and said electronic document being superimposed where a composition window placement is movable with respect to said electronic document during said configuring;
   one or more computer processors using said composition environment to configure said digital signature appearance in said composition window;
   one or more computer processors associating an absolute scale to said digital signature appearance where said absolute scale and said composition window placement facilitate alignment of elements of said digital signature appearance with elements of said electronic document; and
   one or more computer processors using said composition environment to specify a reference point in said composition window, whereby locations of said elements of said digital signature appearance are relative to said reference point and said reference point being operable for use as a placement origin point.

2. The digital signature method of claim 1, in which said Step of graphic configuring further comprises the Step of determining a graphic scaling factor that said digital signature appearance will be displayed at.

3. The digital signature method of claim 2, further comprising the Step of specifying a placement point to display said digital signature appearance in an electronic document.

4. The digital signature method of claim 3, further comprising the Step of determining a digital signature appearance placement location in said electronic document at least partially based on said reference point and said placement point.

5. The digital signature method of claim 4, further comprising the Step of configuring said digital signature appearance into said electronic document at a placement location and scale at least partially based on said digital signature appearance placement location and said scaling factor.

6. The digital signature method of claim 5, in which said Step of configuring said digital signature appearance into said electronic document comprises a multi-page mode procedure comprising the Steps of:
   prompting a user for multiple pages of said electronic document to apply said configured digital signature appearance;
   creating an appearance area in at least some of said multiple pages, the location of said appearance area at least in part based upon said placement location; configuring said appearance area with an appearance;
   placing said configured digital signature appearance into at least some of said configured appearance areas.

7. The digital signature method of claim 1, in which said Step of graphic configuring further comprises the Step of inserting and optionally scaling a new graphic element into said digital signature appearance or editing the graphics properties of an existing graphic element.

8. The digital signature method of claim 1, in which said Step of specifying a reference point comprising the Step of initializing said reference point to an optionally changeable default value.

9. A computer program product for configuring a digital signature appearance graphic into an electronic document, the computer program product-comprising:
   computer code that generates a composition environment for configuring said digital signature appearance graphic where said composition environment comprises a composition window separate from said electronic document and tools for said configuring, said composition window and said electronic document being superimposed where a composition window placement is movable with respect to said electronic document during said configuring;
   computer code that uses said composition environment to configure a graphical appearance of said digital signature appearance graphic in said composition window;
   computer code that associates an absolute scale to said digital signature appearance where said absolute scale and said composition window placement facilitate alignment of elements of said digital signature appearance with elements of said electronic document;
   computer code that uses said composition environment to specify a reference point in said composition window, whereby locations of said elements of said digital signature appearance are relative to said reference point and said reference point being operable for use as a placement origin point; and
   a computer-readable medium that stores the computer program product.

10. The computer program product of claim 9, in which said graphic configuring further comprises the determining a graphic scaling factor that said digital signature appearance will be displayed at.

11. The computer program product of claim 9, further comprising computer code that determines a digital signature appearance placement location in said electronic document at least partially based on said reference point and a specified placement point.

12. The computer program product of claim 11, further comprising computer code that configures said digital signature appearance into said electronic document at a placement location and scale at least partially based on said digital signature appearance placement location and said scaling factor.

13. A method for configuring a digital signature appearance graphic into an electronic document, the method being embodied as instructions executed by one or more computer processors, the method comprising the Steps of:
   one or more computer processors specifying a reference point in a composition window separate from said electronic document, said composition window and said electronic document being superimposed where a composition window placement is movable with respect to said electronic document during said configuring, said reference point being operable for use as a placement origin point;

one or more computer processors associating an absolute scale to said digital signature appearance where said absolute scale and said composition window placement facilitate alignment of elements of said digital signature appearance with elements of said electronic document;

one or more computer processors determining a graphic scaling factor that a digital signature appearance will be displayed at;

one or more computer processors determining a digital signature appearance placement location in said electronic document at least partially based on said reference point and a specified point in said electronic document; and one or more computer processors configuring said digital signature appearance into said electronic document at a placement location and scale at least partially based on said digital signature appearance placement location and said scaling factor.

14. The digital signature method of claim 13, further comprising Steps for graphically configuring said digital signature appearance in said composition window prior to said Step of configuring said digital signature appearance into said electronic document.

* * * * *